United States Patent Office 3,738,903
Patented June 12, 1973

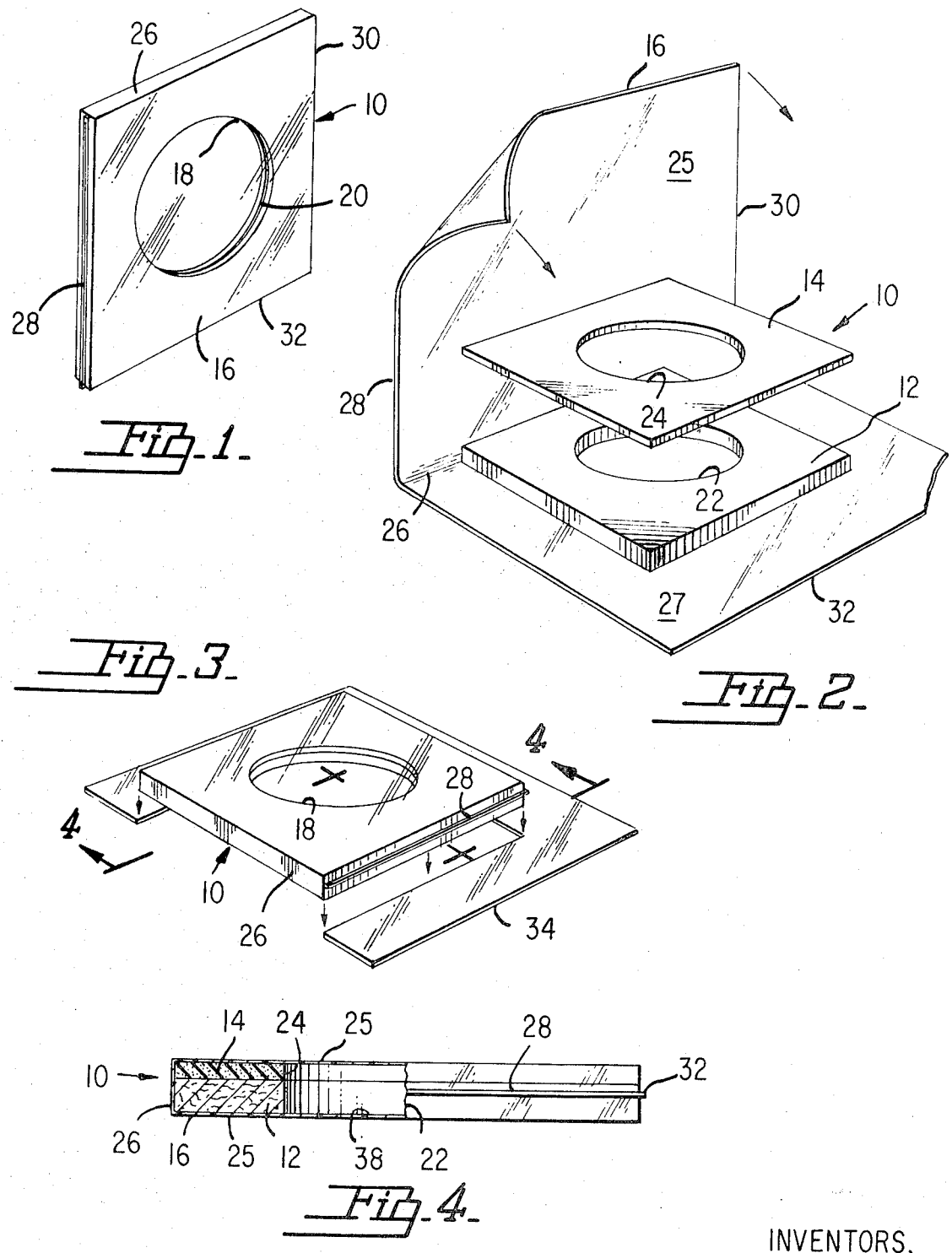

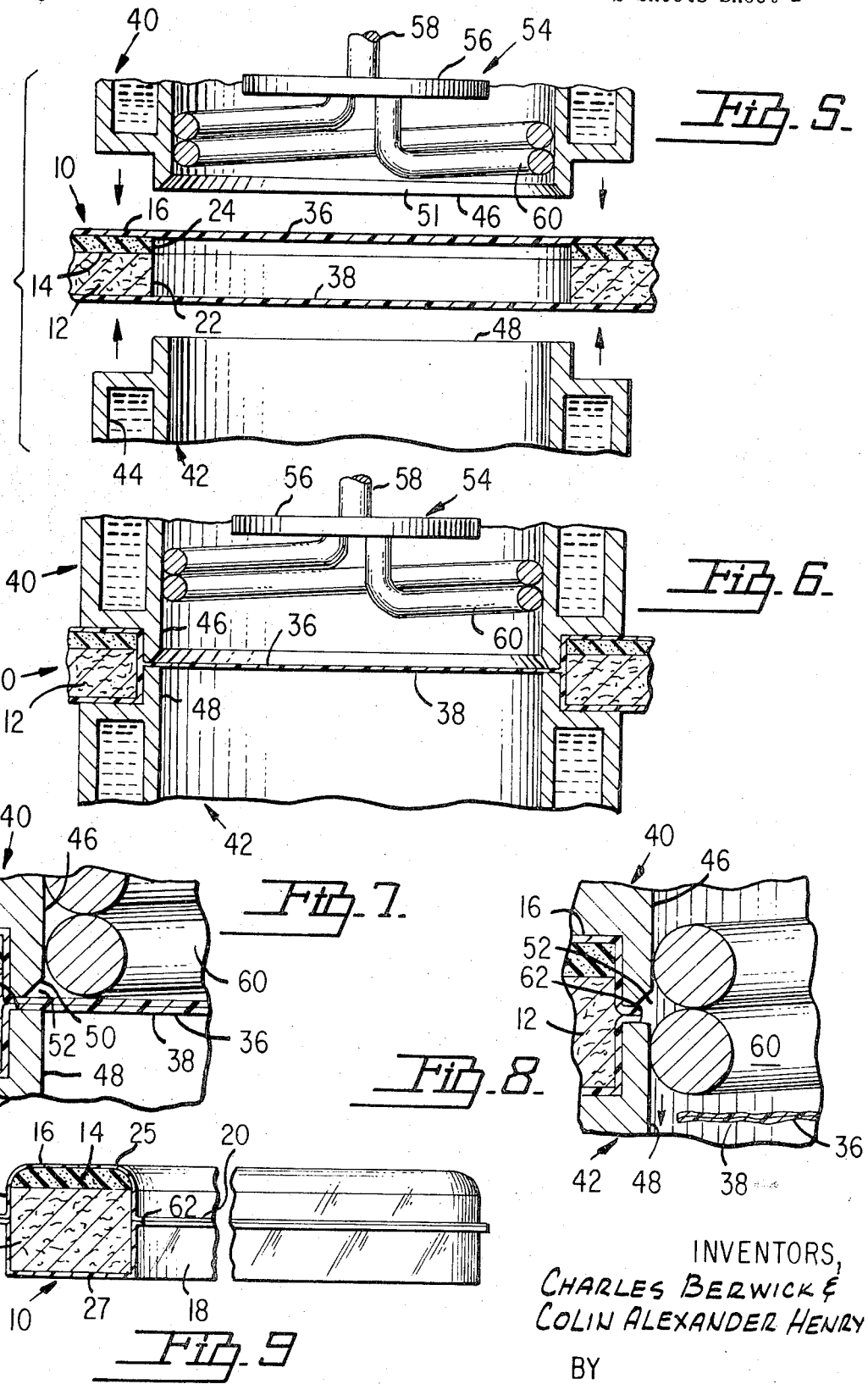

3,738,903
HERMETIC SEALING OF APERTURED ARTICLES
Charles Berwick, Yardley, Pa., and Colin Alexander Henry, Princeton Junction, N.J., assignors to Homasote Company, Trenton, N.J.
Filed May 24, 1971, Ser. No. 146,047
Int. Cl. B65b 53/02; B65d 65/38, 65/02
U.S. Cl. 161—113                    5 Claims

ABSTRACT OF THE DISCLOSURE

An apertured article of manufacture, for example an end suspension panel for a reel on which a web of material may be wound, is hermetically sealed in a plastic film envelope both along the periphery and along the edge of an aperture of the article. Opposite faces of the envelope, normally unconnected in the area of the aperture, are there brought together and heat-sealed.

The invention also embraces a method of hermetically sealing opposite, normally unconnected, faces of a plastic film envelope along the edge of an aperture of an enclosed article by clamping them together along the edge and thereafter heat-sealing them adjacent the clamping location.

Apparatus for effecting a hermetic seal of a plastic film envelope, along the edge of an aperture formed in a housed article, includes opposed annular clamping jaws that clamp face or cover portions of the envelope together within the aperture, after which a correspondingly shaped heating element enters the aperture, heat-seals the cover portions, and removes unwanted areas.

BACKGROUND OF THE INVENTION

(1) Field of the invention

The invention pertains to the art of protectively enclosing articles of manufacture, in particular the hermetic sealing of apertured articles, usually of a generally flat configuration, in such fashion as to leave the apertures thereof open while at the same time providing a hermetic seal not only about the outer periphery of the article, but also, along the edge of the aperture thereof.

(2) Description of the prior art

The prior art known to applicant includes a number of patents some of which relate to the wrapped articles themselves, while others relate to methods employed in the packaging operation and apparatus devised for the purpose of applying the wrapping.

As prior art, the following patents are known and are believed to be of interest:

| Name | Patent No. |
|---|---|
| Angier | 1,354,371 |
| McDermott | 2,615,606 |
| Whytlaw | 2,668,402 |
| Thompson | 2,692,464 |
| Curry | 2,878,628 |
| Harrison | 3,005,542 |
| Wohlforth | 3,024,584 |
| Branick | 3,085,373 |
| Taylor, Jr., et al. | 3,203,543 |
| Hill | 3,437,195 |

All of these patents are concerned with the envelopment, often in a hermetically sealed wrapper or the like, of articles of manufacture having in common the formation of an opening in said articles. The problem solved by the present invention, however, goes beyond the mere application of a transparent plastic film wrapper to an annular or apertured article. In the present invention, the application of the plastic film envelope is not for the purpose of protectively packaging an article temporarily, while awaiting, for example, sale to the consumer. Rather, in the present instance, the application of the plastic film envelope is primarily designed (though it may quite possibly have wider application) to a problem existing in the art of the manufacture of reels, spools, or the like on which web-like material, such as base films intended for end use as magnetic tape, is wound.

Such material is readily shipped in the form of rolls of the material wound onto a cylindrical core. To avoid damage to the surface or to the ends of the rolls, they have been shipped in packages or containers in which the core is suspended at its ends between end panels. These must be of substantial, strong material, but have the undesirable characteristic of presenting a hard surface to the ends of the rolls. As a consequence, end damage often results. Accordingly, it is known to insert padding between the roll ends and the end panels. The padding, however, tends to produce loose particulate matter within the package.

Such matter can be highly deleterious to some materials, e.g., polyethylene terephthalate destined for use as a base film for magnetic tape. The uses to which such materials are put demand that they be shipped in a virtually dust-free container. Contaminating matter can also be formed from wood or fibrous board end panels themselves by jostling during shipment. Even if maximum care is taken to use a padding material and an end panel composition with low tendencies to form contaminating matter, the components may still lack abrasion resistance.

In application Ser. No. 60,422, filed Aug. 3, 1970, now U.S. Pat. No. 3,685,644, a package and method are disclosed embracing the concept of shrink-wrapping the panel member and covering layer in plastic film, to solve the stated problem. However, that application does not address itself to the more specific problem of providing a simple, commercially feasible instruction, method, and apparatus wherein a strong, substantially flush, hermetic seal of the plastic film envelope is extended along the wall of the aperture of the panel and its cushioning pad, in an arrangement wherein the cylindrical core can be assembled with the panel without destroying the hermetic seal of the wrapper, and without reduction of the strength and general efficiency of the connection between the core and the end suspension panels cooperating therewith in defining a spool or reel for the magnetic tape or other web-like product carried thereby.

SUMMARY OF THE INVENTION

Summarized briefly, the present invention relates to an article of manufacture, method, and apparatus covering the concept of hermetically sealed articles, such as the end suspension panels described above, in such fashion that a shrink-wrapped, plastic film envelope or wrapper is correspondingly apertured, despite the fact that it covers the opposite faces, and is sealed about the periphery, of the article involved. In accordance with the invention, the opposite faces or cover portions of the wrapper are brought together contiguous to the wall of the aperture of the article, and are heat-sealed and beaded along the sealed joint of the cover portions, with the unwanted area bounded by the seal being removed substantially simultaneously wtih the effecting of the sealing action.

In accordance with the invention, the entire article is initially covered, comparatively loosely, with the plastic film envelope material. The peripheral edges on the material are then heat-sealed so as to hermetically, sealably enclose the complete periphery of the article. Opposed, annular clamping jaws are then relatively moved into the aperture of the article, to clamp together the opposite faces or cover portions of the wrapper along the wall of the aperture. Interiorly of the clamping jaws, an annular heating element is movable independently of the jaws, along an axial path common to that of the jaws, past the plane of the clamped cover portions, to heat-seal said portions together and at the same time burn through and remove the unwanted areas of the cover portions bounded by the seal.

The invention further contemplates the provision of a cross sectional shape of the cooperating jaws, such as to define an inwardly opening, angular recess within which the respective faces or cover portions of the envelope are clamped. The application of heat by the annular heating element occurs at the open sides of the continuous, annular recess defined between the jaws, and as a result, the material of the envelope disposed within the recess is beaded within the recess, simultaneously with the heat-sealing of the envelope material in said recess.

The is thus provided a substantially flush, exceptionally strong, hermetic seal of the envelope extending along the wall of the aperture of the padded panel member, and said beaded seal joint is found to lie closely against the wall of the aperture after the envelope is shrink-wrapped, in such fashion as to present a minimum interference to entry of the associated cylindrical core. Further, the joint is of such strength that entry of the core does not break the hermetic seal along the edge of the aperture.

BRIEF DESCRIPTION OF THE DRAWING

FIG. 1 is a perspective view of an end suspension panel in its completed form, constructed according to the present invention, said panel having the beaded, hermetically sealed joint hereinbefore referred to, along the edge of the central, roll-receiving aperture of the panel;

FIG. 2 is an enlarged, exploded perspective view of the component parts of the invention, at an early stage of their assembly;

FIG. 3 is an exploded perspective view, on the same scale as FIG. 2, showing the article at a later stage of assembly or manufacture thereof;

FIG. 4 is a still further enlarged sectional view substantially on line 4—4 of FIG. 3, portions being broken away;

FIG. 5 is a vertical section, partially exploded, illustrating the article of FIG. 4 in position to be subjected to the next following step of manufacture, said article and the apparatus employed in construction of the same being illustrated fragmentarily and in vertical section;

FIG. 6 is a vertical sectional view showing the article with the cover portions clamped together, in a step following that shown in FIG. 5;

FIG. 7 is a still further enlarged, fragmentary, detailed sectional view illustrating a manufacturing step following that shown in FIG. 6;

FIG. 8 is a view like FIG. 7 showing the step after that illustrated in FIG. 7; and FIG. 9 is a view like FIG. 4 showing the article in its final, completed form.

DESCRIPTION OF THE PREFERRED EMBODIMENT

The reference numeral 10 generally designates an end suspension support panel adapted, in cooperation with a similarly formed panel, and with a cylindrical roll core (not shown) to provide a roll or spool upon which any of various web-like products can be wound. For example, a roll of the character described is commonly employed, as fully described in the above-designated application Ser. No. 60,422, now U.S. Pat. No. 3,685,644, as a means for packaging and shipping such materials as polyethylene terephthalate intended for end use as a base film for magnetic tape.

In a use such as described, it is of great importance that the supported product be kept in a dust-free condition. Accordingly, the panel 10 illustrated in FIG. 1 is specially designed, as covered in the aforementioned patented application, to include a panel member 12 which in the present instance is of rectangular configuration, a cushioning layer or pad 14, and a plastic film envelope 16 shrink-wrapped about the panel member and cushioning layer, and hermetically sealing the same so as to prevent flaking or other dissemination of loose particulates within the shipping container. An end suspension support panel such as illustrated, in other words, comprises a centrally apertured, resiliently padded member that reduces the possibility of damage to the ends of the web-like material supported between the end panels of the reel, reduces the possibility of contamination of said material, and additionally encases the padded article in a plastic film having abrasion resistance and satisfactory tear strength.

The end panel 10 shown in FIG. 1 is provided with a circular central opening 18 adapted to receive the cylindrical roll core, not shown, on which the web-like material (also not shown) would be wound for shipment. The plastic film wrapper 16, as will presently be described in full detail hereinafter, is correspondingly apertured, and the opposite cover portions thereof are hermetically, sealably joined as at 20, contiguous to the wall of the center opening 18.

The present invention does not cover the broad concept of an end suspension support panel of cushioned construction having a shrink-wrapped plastic film envelope. Rather, the present invention is directed to the specific feature involving the hermetic sealing of opposed cover portions of the envelope, especially along the edge of an opening of the enclosed article, and is further directed to the method and apparatus employed to accomplish this result.

Accordingly, in FIG. 2 there is shown the end panel 10 at an early stage of manufacture. As shown in this figure of the drawing, said end panel includes the panel member 12 of square outer configuration formed with a circular center opening or aperture 22, the cushioning layer or pad 14 superimposed upon the member 12 and similarly formed with a center opening 24 registering with opening 22, and the plastic envelope or wrapper 16 illustrated as comprising a sheet of plastic film folded along a transverse line 26 upon itself to define opposed cover portions 25, 27 which in the completed article overlie the opposite faces of the cushioned panel element defined by member 12 and cushioning layer 14.

To facilitate a full understanding of the construction, it is deemed advisable to consider the fold line 26 as a back edge of the article, and to consider that edges 28 and 30 are side edges while edge 32 is a front edge. In actuality, a panel of this type has no back edge or front edge as such, and it is to be understood that these terms are used only to identify particular edges of the article in the description, to facilitate understanding thereof and to provide a ready reference for the appended claims.

In any event, in the illustrated example, it is thus seen that the plastic film sheet, which may be a film of polyethylene, polypropylene, polyvinyl chloride, or polyethylene terephthalate, when folded upon itself integrally connects the opposed face or cover portions 25, 27 along the back edge 26, while leaving said cover portions in superposed relationship along the side and front edges of the panel. The folded sheet projects beyond said side and front edges (see FIGS. 2 and 3), and in manufacture of the article, suitable means is employed to heat-seal the peripheral areas of the folded sheet, after which the unwanted portions of said sheet are cut off as at 34 in FIG. 3 along the side and front edges 28, 30, 32 respectively. As a result, the panel member 12 and cushioning layer 14 are now completely enclosed in a plastic film envelope, which is hermetically sealed through the full outer periphery of the panel 10.

Initially, the envelope receives the members 12, 14 comparatively loosely, and at this stage, the article appears as in FIG. 4, wherein the cover portions 25, 27 have center areas 36, 38 respectively, extending across registered apertures 22, 24 and spaced apart by the thickness of the members 12, 14 in their superimposed relationship.

As a next step, the enveloped article shown in FIG. 4 is disposed between opposed upper and lower clamping elements or jaws 40, 42 respectively. Each jaw, in a preferred embodiment, incorporates cooling means, and in the present instance said cooling means comprises water-cooled jackets 44 extending the full circumference of the clamping jaws.

Referring to FIG. 5, the jaws have opposed, annular clamping rings 46, 48 respectively, the outer diameters of which are such as to cause them to be snugly received within the registered center apertures 22, 24 of members 12, 14 respectively. This is shown in FIG. 6, and it will be understood that the jaws are mounted in any suitable manner for movement toward and away from each other along a common axial path A shown in FIG. 5.

It is also of interest, as shown in FIGS. 7 and 8 to particular advantage, to note that one of the rings, in the illustrated example of the upper ring 46, has an internal chamfer 50, included at a substantial angle in reference to the opposed face 51 of the other clamping ring 48. As a result, there is defined between the clamping rings an inwardly opening recess extending through the full circumference of the jaw assembly. This recess, as shown in FIG. 7, is of acute-angular configuration when seen in cross-section at any point about the circumference of the jaw assembly.

When the clamping rings are moved toward each other, they bring together the spaced center areas 36, 38 of the cover portions of the plastic envelope (see FIG. 6), so that said areas now are disposed in face-contacting relationhip, in a plane midway between the opposite faces of the article, said plane being disposed normally to the path of movement of the jaws toward and away from each other.

Designated generally at 54 in FIGS 5 and 6 is a sealing and cutting assembly, mounted within the jaw assembly constituted by the clamping jaws 40, 42 for movement independently of the jaws along the path A hereinbefore described. Assembly 54 includes a flat, disc-like base 56, fixedly secured to a plunger or ram 58. Plunger 58 is adapted to shift the disc 56, and a heating element 60 carried thereby, from its normally retracted position shown in FIG. 6, to a final position shown in FIG. 8 in which it moves past the plane of the superposed, contacting, clamped areas 36, 38 of the cover portions.

To this end, the heating element 60 is extended in a circular path, and may comprise a plurality of closed convolutions if desired. Heating element 60 has an outer diameter substantially equal to the inner diameter of the jaws 40, 42, so that with the jaws in their clamping position shown in FIGS. 6 and 7, the outer diameter of the heating element 60 is in slidable, wiping contact with the inner surfaces of the jaws.

Accordingly, the heating element is initially moved from the FIG. 6 to the FIG. 7 position thereof, and applies heat to the contacting areas 36, 38 at the location where the annular recess 52 opens inwardly toward the heating element.

The application of the heat is such that the portions of the areas 36, 38 disposed within recess 52 are heat-sealed. However, where the heating element 60 is in direct contact with said areas 26, 28, the heat is concentrated to an extent as to cut through the areas on further travel of the heating element from the FIG. 7 to the FIG. 8 position thereof, so that the unwanted, circular areas bounded by the heat-seal drop away as shown in FIG. 8. Meanwhile, the sealably joined portions shrink into a tapered bead 62 molded by the recess 52 as shown in FIG. 8, which bead remains after the jaws are separated and the heating element 60 is retracted.

As a result, the envelope is provided with a center aperture corresponding to the registered openings of the members 12, 14, and the opposed cover portions 25, 27 are hermetically, sealably joined by a bead seam 20 (see FIG. 9) contiguous to the wall of said aperture.

The final step is to shrink-wrap the envelope to the members 12, 14, this being a conventional process requiring no special illustration herein. This imparts a curvature shown in FIG. 9 to particular advantage, over the outer periphery of the cushioning pad, and extending also over the area of said pad immediately bounding the center opening of the article. Further, the beaded seam 20, which affords a particularly strong hermetic seal within the center opening, is brought up tightly against the wall of the aperture of the panel, so that the subsequent insertion of the end of a cylindrical core, and the tight-fitting of said core within the aperture, is achieved without difficulty and without loss of the sealing action.

The abstract of this application is not intended to constitute a comprehensive discussion of all the principles, possible modes or applications of the invention disclosed in this document and should not be used to interpret the scope of the claims which appear hereinafter.

We claim:

1. A hermetically sealed, apertured article of manufacture comprising:
   (a) a member formed with an aperture; and
   (b) a sealing envelope therefor including upper and lower cover portions between which said member is interposed, said portions being sealably joined about the periphery of said member to provide an outer hermetic seal, said portions respectively having openings registering with said aperture, the edges of the openings being hermetically, sealably joined within the aperture to provide an inner hermetic seal for said member.

2. A hermetically sealed article as in claim 1 wherein the envelope is formed with a sealing bead extending continuously along the line of juncture of said edges within the aperture.

3. A hermetically sealed article as in claim 1, wherein said envelope is wholly comprised of a plastic film material.

4. A hermetically sealed article as in claim 2 wherein the envelope comprises a single sheet of said plastic film material folded upon itself to define said cover portions and to effect an integral connection of said portions along one peripheral area of the member, the cover portions having edges registered and sealably joined along the remainder of the periphery of said member.

5. A hermetically sealed article as in claim 4 wherein the envelope is shrink-wrapped about said member.

References Cited

UNITED STATES PATENTS

| | | | |
|---|---|---|---|
| 2,957,792 | 10/1960 | Magid | 156—251 |
| 2,992,457 | 7/1961 | Harrison | 156—86 X |
| 3,020,188 | 2/1962 | Zompa | 156—293 X |
| 3,344,577 | 10/1967 | Harm | 156—251 X |
| 3,526,315 | 9/1970 | Killian | 206—46 R |
| 3,607,496 | 9/1971 | Kissell | 156—85 X |
| 3,679,048 | 7/1972 | Fujio | 206—46 R |
| 3,681,891 | 8/1972 | Stryck | 53—30 |
| 3,694,995 | 10/1972 | McKinney | 53—30 |
| 3,698,586 | 10/1972 | Terner | 156—86 X |

HAROLD ANSHER, Primary Examiner

U.S. Cl. X.R.

53—13, 30; 156—86, 251, 253, 267, 293, 306; 161—45, 106, 147; 206—46 R